(12) United States Patent
Dahrouj et al.

(10) Patent No.: US 8,902,808 B2
(45) Date of Patent: Dec. 2, 2014

(54) INTERFERENCE MITIGATION WITH SCHEDULING AND DYNAMIC POWER SPECTRUM ALLOCATION FOR WIRELESS NETWORKS

(75) Inventors: Hayssam Dahrouj, Toronto (CA); Wei Yu, Toronto (CA); Taiwen Tang, Jintang (CN); Steve Andre Beaudin, Ottawa (CA)

(73) Assignee: BLINQ Wireless Inc., Ottawa, Ontario ( * ) Notice: Subject to any disclaimer, the term of this patent is extended or adjusted under 35 U.S.C. 154(b) by 254 days.

(21) Appl. No.: 13/463,478

(22) Filed: May 3, 2012

(65) Prior Publication Data

US 2012/0281648 A1 Nov. 8, 2012

Related U.S. Application Data

(60) Provisional application No. 61/483,417, filed on May 6, 2011, provisional application No. 61/506,895, filed on Jul. 12, 2011.

(51) Int. Cl.
*H04W 52/24* (2009.01)
*H04L 5/00* (2006.01)
*H04W 52/14* (2009.01)

(52) U.S. Cl.
CPC .......... *H04W 52/243* (2013.01); *H04W 52/241* (2013.01); *H04W 52/143* (2013.01); *H04W 52/146* (2013.01); *H04L 5/0073* (2013.01); *H04L 5/0075* (2013.01)
USPC .......................................... 370/318; 455/522

(58) Field of Classification Search
USPC .......................................... 370/318; 455/522
See application file for complete search history.

(56) References Cited

U.S. PATENT DOCUMENTS 6,441,786 B1 * 8/2002 Jasper et al. .................. 342/383

2008/0298486 A1 * 12/2008 Venturino et al. ............ 375/260
2009/0221297 A1 * 9/2009 Wengerter et al. ............ 455/453
2010/0009748 A1 1/2010 Timperley
2010/0159841 A1 6/2010 Barberis et al.

FOREIGN PATENT DOCUMENTS

WO    2008/096383     8/2008
WO    2011/037319     3/2011
WO    WO 2011/037319  *  3/2011  ............ H04W 52/26

OTHER PUBLICATIONS

Venturino et al., entitled "Coordinated Scheduling and Power Allocation in Downlink Multicell OFDMA Networks," IEEE Trans. Veh. Technol., vol. 6, No. 58, pp. 2835-2848, Jul. 2009.
Stolyar et al., entitled "Self-Organizing Dynamic Fractional Frequency Reuse for Best-Effort Traffic Through Distributed Inter-Cell Coordination," in INFOCOM, Apr. 2009.

* cited by examiner

*Primary Examiner* — Hoon J Chung
(74) *Attorney, Agent, or Firm* — Ridout & Maybee LLP

(57) ABSTRACT

Systems, methods and apparatuses are provided for mitigating interference in wireless networks, and particularly in an advanced backhaul wireless network comprising several hubs, each hub serving its own remote backhaul modules (RBMs). Preferred embodiments provide practical power spectrum adaptation methods for the management of interhub interference. These methods are shown to improve the overall network throughput significantly compared to a conventional network with fixed transmit power spectrum. Optionally, joint scheduling and power control are used to optimize the network utility. Also provided are methods which evoke the channel average gains generated by measurements for managed adaptive resource allocation (MARA). The proposed methods are computationally feasible and fast in convergence. They can be implemented in a distributed fashion across all hubs. Some of the proposed methods can be implemented asynchronously at each hub.

31 Claims, 16 Drawing Sheets

| Cellular Layout | Hexagonal |
|---|---|
| Number of Hubs | 7 |
| Frequency Reuse | 1 |
| Number of RBMs per Hub | 4 |
| Duplex | TDD |
| Channel Bandwidth | 10 MHz |
| Hub Max Tx Power per Subcarrier | -32.7006 dBw |
| SINR Gap | 12 dB |
| Total Noise Power Per Subcarrier | -158.6098 dBw |
| Distance-dependent Path Loss | $128.1 + 37.6 \log_{10}(d)$ |
| FFT Size | 1024 |

FIG. 3

| Hubs | Novel Rates, in bps/Hz (based on MARA IFEM) | Novel Rates, in bps/Hz (based on IFEM) |
|---|---|---|
| 1 | 4.0591 | 4.0613 |
| 2 | 6.4844 | 6.4836 |
| 3 | 6.1568 | 6.1568 |
| 4 | 9.5435 | 9.5429 |
| 5 | 6.1888 | 6.1894 |
| 6 | 7.4747 | 7.4769 |
| 7 | 9.8392 | 9.8378 |
| Total | 49.7465 | 49.7486 |

FIG. 6

| Sum Rate in bps/Hz | $d_1 = 0.5$km | $d_1 = 1$km |
|---|---|---|
| IHEM | 60.68 | 91.33 |
| MARA IHEM | 60.67 | 91.33 |
| HSNM | 60.68 | 91.33 |
| MARA HSNM | 60.67 | 91.33 |
| Full-IHEM | 62.61 | 91.58 |
| MHEM | 62.61 | 91.58 |
| MARA NM | 62.59 | 91.57 |
| AP MARA IHEM | 56.88 | 88.13 |
| Max Power Method | 53.01 | 86.22 |
| Full-IHEM Gain Compared to Max Power | 18.1% | 6.2% |

FIG. 10

| Sum Rate in bps/Hz | Cell-edge at $d_2$ = 303m | Cell-center at $d_2$ = 125m |
|---|---|---|
| IHEM | 34.84 | 78.39 |
| MARA IHEM | 34.83 | 78.38 |
| HSNM | 34.84 | 78.39 |
| MARA HSNM | 34.83 | 78.38 |
| Full-IHEM | 41.11 | 78.77 |
| MIHEM | 41.11 | 78.77 |
| MARA NM | 41.09 | 78.76 |
| AP MARA IHEM | 31.54 | 75.00 |
| Max Power Method | 30.54 | 71.91 |
| Full-IHEM Gain Compared to Max Power | 34.6% | 9.5% |

FIG. 11

| Sum Rate in bps/Hz | Cell-edge at $d_2 = 667m$ | Cell-center at $d_2 = 250m$ |
|---|---|---|
| IFEM | 44.86 | 83.55 |
| MARA IFEM | 44.86 | 83.55 |
| HSNM | 44.86 | 83.55 |
| MARA HSNM | 44.86 | 83.55 |
| Full-IFEM | 46.86 | 84.24 |
| MIFEM | 46.86 | 84.24 |
| MARA NM | 46.85 | 84.23 |
| AP MARA IFEM | 43.16 | 82.14 |
| Max Power Method | 41.49 | 80.18 |
| Full-IFEM Gain Compared to Max Power | 12.9% | 5.1% |

FIG. 12

INTERFERENCE MITIGATION WITH SCHEDULING AND DYNAMIC POWER SPECTRUM ALLOCATION FOR WIRELESS NETWORKS

CROSS-REFERENCE TO RELATED APPLICATIONS

This application claims priority from U.S. Provisional Application No. 61/483,417, filed 6 May 2011, by the present inventors, entitled "INTERFERENCE MITIGATION WITH SCHEDULING AND MARA-BASED DYNAMIC POWER SPECTRUM ALLOCATION FOR [NLOS] WIRELESS BACKHAUL NETWORKS" and also claims priority from U.S. Provisional Application No. 61/506,895, filed 12 Jul. 2011, by the present inventors, entitled "INTERFERENCE MITIGATION WITH SCHEDULING AND DYNAMIC POWER SPECTRUM ALLOCATION FOR WIRELESS NETWORKS".

This application is related to PCT application No. PCT/CA2011/001020, filed 12 Sep. 2011, entitled "SYSTEM AND METHOD FOR CO-CHANNEL INTERFERENCE MEASUREMENT AND MANAGED ADAPTIVE RESOURCE ALLOCATION FOR WIRELESS BACKHAUL" and U.S. application Ser. No. 13/230,368, filed 12 Sep. 2011, entitled SYSTEM AND METHOD FOR CO-CHANNEL INTERFERENCE MEASUREMENT AND MANAGED ADAPTIVE RESOURCE ALLOCATION FOR WIRELESS BACKHAUL", which claim priority from U.S. Provisional Application No. 61/382,217, filed 13 Sep. 2010, by S. Beaudin, entitled, "SYSTEM AND METHOD FOR CO-CHANNEL INTERFERENCE MEASUREMENT AND MANAGED ADAPTIVE RESOURCE ALLOCATION FOR WIRELESS BACKHAUL".

All these applications are incorporated herein by reference, in their entirety.

TECHNICAL FIELD

This invention relates to wireless cellular networks, wireless backhaul for high capacity data networks, and to systems and methods for mitigating interference. It is especially applicable to practical power spectrum adaptation techniques for Non Line of Sight (NLOS) wireless backhaul products in MicroCell and PicoCell networks, as well as fixed wireless access.

BACKGROUND

Interference is a major bottleneck in wireless systems design. The performance of each user or link in a wireless network depends not only on its own transmission, but also on the interference coming from other links or users' transmissions. When one user tries to improve its performance by increasing its transmitted power, it automatically generates more interference for other users, thereby degrading their performance. To combat interference, traditional technologies service multiple users within each cell by distributing them over orthogonal dimensions, e.g. in different time slots as in Time Division Multiple Access (TDMA) systems, or over different frequency bands as in Frequency Division Multiple Access (FDMA) systems, or by spreading them across time and frequency as in Code Division Multiple Access (CDMA) systems.

Developing and optimizing more advanced, yet practical, interference mitigation techniques becomes particularly important nowadays, due to the rapid pace of growth of wireless networks and their enormous data usage, and the scarcity of the available radio resources, e.g. bandwidth and transmit power.

The performance of future (next generation) wireless networks is therefore expected to depend strongly on the feasibility of the dynamic power spectrum optimization methods, specifically developed to minimize or even to eliminate interference, as a means to achieving higher data capacity and increase system reliability.

In particular, there is a need to address resource allocation problems and provide a practical optimization method to decide which user should be served over a particular frequency tone in an orthogonal frequency division multiple access (OFDMA) system, and which transmit power should be allocated at each specific tone.

The problems of scheduling and power control have been extensively considered in the past, both separately and jointly, e.g., in copending PCT patent publication No. WO/2011/037319, published 31 Mar. 2011, by T. Kwon, W. Yu, C. Shin, and C. Hwang, entitled "Method and Device for User Scheduling and Managing Transmit Power in a Communication System". (Kwon et al.), in an article by L. Venturino, N. Prasad, and X. Wang, entitled "Coordinated Scheduling and Power Allocation in Downlink Multicell OFDMA Networks," *IEEE Trans. Veh. Technol.*, vol. 6, no. 58, pp. 2835-2848, Jul. 2009 (Venturino et al.), and in an article by A. L. Stolyar and H. Viswanathan, entitled "Self-Organizing Dynamic Fractional Frequency Reuse for Best-Effort Traffic Through Distributed Inter-Cell Coordination," in *INFOCOM*, April 2009 (Stolyar et al.). These references will be referred to again in the following paragraphs simply as references Kwon et al., Venturino et al. and Stolyar et al., respectively.

For the power spectrum optimization problem in an OFDMA network, the main challenge has always been to find computationally efficient methods to allocate the power of the different transmitters across the different frequency tones. The work described in Kwon et al., which proposes a power adaptation method based on Newton's method (NM), is particularly relevant to this problem. The method described in Kwon et al. shows a significant gain compared to the most straightforward method of transmitting at the maximum allowable power for all transmitters across all tones. The method in Kwon et al. is, however, both computationally complex, and relatively slow in convergence, albeit being faster than previously proposed methods.

Thus, there is a need for novel, feasible, and practical methods for power spectrum optimization. While interference mitigation is advantageous for all types of wireless communication systems, it is particularly relevant to the development of next-generation wireless backhaul products for compact base-stations, and Non Line of Sight (NLOS) type of backhaul networks, for example. NLOS backhaul technology provides a cost-effective wireless NLOS method to increase the cell site capacity of PicoCell and MicroCell deployments. In a system of this type, a cellular network may comprise several PicoCells, each covering a relatively small area, as a means to increase the network capacity for areas with dense data traffic. The users within each PicoCell are served by their own PicoCell base-station, also called access modules (AM). The AMs are collocated with the remote backhaul modules (RBM). Each RBM is connected to some central base-stations, also known as the hubs, via wireless backhauls links which are meant to replace the expensive optical fiber links. The hubs are responsible for the transmission strategies and radio resource management for the different RBMs. Unlike the classical relay problem, the backhaul architecture assumes that the wireless backhauls links and the access links operate at different frequencies. From a backhaul design perspective, the interest is therefore mitigating the interhub interference, thereby maximizing the aggregate data capacity of the RBMs.

NLOS backhaul technology has been an area of considerable research and development activity of late. In particular, the above referenced copending PCT application and US patent application claiming priority from U.S. provisional application No. 61/382,217 (Beaudin), disclose a method for measuring the co-channel interference in a NLOS environment, and for scheduling resources based on measured co-channel interference data. This method is referred to herein as managed adaptive resource allocation (MARA). In particular embodiments, the methods disclosed in Beaudin comprise measuring data indicative of interference, e.g. the channel gain, between each hub and each RBM Unit, periodically during active service. The corresponding measurements can be thought of, or represented, as a channel matrix whose entries describe the frequency domain channel gains between each hub and each RBM of the interference environment. This matrix of measurements, e.g. frequency domain channel gains will be referred to herein as a MARA matrix. In Beaudin, the MARA matrix is used, for example, to intelligently group each RBM to its most favorable hub, as well as to allocate resource blocks in such a way as to reduce interference between links and optimize aggregate capacity of the network, so as to organize the network resources in an optimal configuration.

An object of the present invention is to provide improved or alternative methods for interference mitigation, with scheduling and power allocation, which may be particularly applicable for NLOS wireless backhaul networks. There is a particular need to derive practically feasible methods for power spectrum optimization, with lower complexity and faster convergence than the Newton methods disclosed in Kwon et al. It would also be beneficial to take advantage of the measurements in an active network, such as disclosed in Beaudin, for novel or improved interference mitigation and/or power control methods.

SUMMARY OF INVENTION

Thus, the present invention seeks to provide improvements to, or mitigate disadvantages of, these known systems and methods, or at least provide an alternative.

Aspects of the present invention provide methods, systems, apparatuses and software products for interference mitigation, with scheduling and power allocation, based on iterative operations with reduced computational complexity and/or faster convergence.

In particular, a first aspect of the invention provides a method for mitigating interference in a wireless network comprising a plurality of nodes, each comprising a transmitter and a receiver, comprising the steps of:

determining an appropriate power spectral density level, for each of the plurality of nodes at each of a plurality of tones, based on known scheduling assignments and frequency domain channel gains for each link, comprising:

performing an iterative operation to find the power spectral density at each tone, on an individual tone-by-tone basis, or optionally, on a tone set-by-set basis;

updating power levels of each node, at each iteration and at each tone or for each tone set;

wherein the iterative operation comprises, based on an initial power level or a power level of a previous iteration, and for an objective function based on scheduling assignments for each node at all tones or tone sets, iteratively optimizing a weighted sum-rate across all nodes.

The frequency domain channel gains comprise per tone channel gains, and the method may comprise updating and allocating power on a tone by tone basis at each iteration.

Tones may comprise sets of tones $S \subseteq \{1, \ldots, N\}$ where N is the number of tones of the OFDMA multiplexing scheme, and said frequency domain channel gains may comprise per tone set channel gains to allow for allocating power at each iteration on a tone-set by tone-set basis.

For cellular networks and wireless backhaul networks, updating of the power levels may comprise adjusting the transmit powers in the downlink and/or the uplink.

In preferred embodiments, nodes of the wireless network comprise hubs of a wireless backhaul network, each hub serving a plurality of RBMs.

While embodiments of the present invention may work with any scheduling policy, preferred embodiments specifically adopt a proportional fairness objective across the RBMs. The disclosed methods then work as follows. For a specific set of channel gains between all hubs and RBMs, and fixed RBM scheduling (over time and frequency), the power spectral density level of every hub at each frequency tone, is adjusted according to practically feasible methods.

When the system performance is limited by interhub interference only, assuming an overall proportional fairness objective across the RBMs, an appropriate objective function can be defined and solved, which depends on the scheduling policy and power spectrum allocation of the different hubs across all tones. For a fixed scheduling policy, the problem becomes a weighted sum-rate optimization as defined in Equation 2.

Methods according to preferred embodiments, called iterative function evaluation method (IFEM) and Theta-IFEM, determine the appropriate power spectral density level of every hub at every frequency tone iteratively, for every specific RBM scheduling. Methods are based on suitable Signal-to-Interference-plus-Noise Ratio (SINR) approximation, with an objective of maximizing the network overall utility. The weights and power levels are updated with the channel conditions and RBM scheduling changes, to adapt dynamically to the interference environment.

Thus, in a preferred embodiment, using a high SINR approximation, called IFEM (Iterative Function Evaluation Method), the power of the lth hub at the nth tone may be calculated iteratively using Equation 3.

In a method according to a second embodiment, called Theta-IFEM, the high SINR approximation of IFEM is corrected by a factor Theta ($\theta$) that corresponds to the maximum power transmission, as set out in Equation 5.

IFEM and Theta-IFEM show faster convergence and lower computational complexity compared to previously developed methods, which makes them amenable to practical implementation. They can also be implemented in a distributed fashion, and asynchronously at each hub. IFEM and Theta-IFEM show a significant performance gain as compared to fixed power transmission strategy, used by the majority of traditional networks.

In methods according third and fourth embodiments, called Full-IFEM and modified IFEM (MIFEM), the proposed equations account for, or adjust for the SINR level or interference level at each iteration, as set out in Equations 6 and 7, respectively.

Full-IFEM and modified-IFEM (MIFEM) have similar performance as the methods proposed in Kwon et al., but with lower computational complexity.

Thus, these methods have particular application for improving the overall backhaul system throughput, by mitigating the interhub interference through power spectrum adaptation Other preferred embodiments are based on IFEM, Theta-IFEM, Full-IFEM, and MIFEM, using frequency domain average channel gains instead of per tone channel gains.

As mentioned above, the entries in a MARA matrix as described in Beaudin may represent the frequency domain channel average gains between all hubs and RBMs in the backhaul wireless network. Due to the fixed deployment of hubs and RBMs, and the existence of the line of sight between each hub and its own RBMs, the frequency domain channel of the backhaul network is relatively flat. The MARA matrix entries thus comprise a good representation of the actual network channel gains, and are used to develop methods according to alternative embodiments.

Thus, a method according to a fifth embodiment, called MARA IFEM uses Equation 4, where the per-tone channel gains used for IFEM, are replaced by the frequency domain average channel gains. Similarly, methods according to sixth, seventh and eighth embodiments are based on Theta-IFEM, Full-IFEM and MIFEM, but, similarly, use the frequency domain average channel gain, and respectively are called MARA IFEM, MARA Theta-IFEM, MARA Full-IFEM, and MARA MIFEM.

Other aspects of the present invention provide systems, apparatuses and computer program products to implement these methods, which present a practical framework for methods with reduced computational complexity or faster convergence, relative to systems and methods, such as describe in Kwon et al., based on Newton's method.

Practical methods and apparatuses are thus provided for mitigating interference in wireless networks by dynamically allocating the power spectrum of the different transmitters across all tones. Advantageously, use may be made of e.g. channel average gains, in the form of a MARA matrix as disclosed in Beaudin, for mitigating the interhub interference in NLOS wireless backhaul products in MicroCell and PicoCell networks, thereby increasing the aggregate data throughput of the different RBMs.

Methods according to another aspect of the present invention are based on novel forms of Newton's method (NM), and in particular, the power spectrum adaptation step comprises a high SINR approximation of Newton's method as presented in Kwon et al. This novel Newton's method called high SINR Newton's method (HSNM), may operate with either actual channel gain values, or with channel average gains of the MARA matrix (MARA-HSNM). Its performance is similar to both IFEM and MARA IFEM, albeit showing a slower convergence behavior.

In other embodiments of the disclosed methods, every hub allocates the same power across one set of tones, rather than on a per-tone basis. This power allocation strategy suits the PHY specifications of several platforms. These tone-set implementations may be based on MARA IFEM, MARA Theta-IFEM, MARA Full-IFEM, MARA MIFEM, MARA Newton's method (MARA NM), or MARA HSNM. As expected, their performance is inferior to the per-tone power spectrum adaptation, especially as the number of tones in each set approaches the total number of tones. However, they show better performance as compared to the fixed power spectrum transmission.

Other aspects of the current invention also provide apparatuses to implement IFEM, Theta-IFEM, Full-IFEM, MIFEM, MARA IFEM, HSNM, MARA Theta-IFEM, MARA Full-IFEM, MARA MIFEM, MARA NM, MARA HSNM, the per-set-of-tones power allocation methods. Each apparatus comprises processing means to find the power allocation of every hub at every tone, and/or alternatively at every set of tones. Each apparatus is evoked dynamically with any change in the channel information or scheduling policy, to determine the appropriate power spectral density levels.

Other aspects of the invention further provide computer program products to implement the methods mentioned above, in systems or apparatuses intended to mitigate interference in wireless systems, via scheduling and adaptive power spectrum adaptation, and particularly for use in NLOS backhaul wireless networks.

In summary, methods disclosed herein are practically feasible for implementation in real systems, because they are computationally simpler and fast in convergence. They also provide an appreciable performance gain as compared to conventional systems performance. Some of the proposed methods can also be implemented in a distributed fashion, and asynchronously at each hub. These methods therefore provide advantages over known methods, such as disclosed in Kwon et al., which are difficult to implement in practice due to the relatively high computational complexity and slow convergence of the power adaptation step.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

FIG. 3 shows a table that summarizes the system parameters of the NLOS wireless backhaul network used to evaluate the performance of the invented methods;

FIG. 6 is a table showing the simulated performance of the individual and total rates for the different hubs, using both IFEM and MARA IFEM; the hub-to-hub distance is set to 0.5 km, and hub-to-RBM distance is set to 0.2 km;

FIG. 10 is a table showing the simulated performance of various proposed methods, for different values of hub-to-hub distance d; the hub-to-RBM distance is set to 0.15 km;

FIG. 11 is a table showing the simulated performance of various proposed methods, for both cell-edge and cell-center RBMs; the hub-to-hub distance is set to 0.5 km;

FIG. 12 is a table showing the simulated performance of various proposed methods, for both cell-edge and cell-center RBMs; the hub-to-hub distance is set to 1 km;

DESCRIPTION OF PREFERRED EMBODIMENTS

Methods for mitigating interference according to preferred embodiments of the invention will be described. These methods are referred to as IFEM, Theta IFEM; Full-IFEM and modified IFEM (MIFEM). MARA based methods are called MARA IFEM, MARA Theta IFEM, MARA Full IFEM. Average Powers (AP) variants of these embodiments are also described.

Also described are methods according to other embodiments which are novel forms of Newton's method (NM) called respectively MARA NM, High SINR NM (HSNM), and MARA HSNM.

The distinctions of these methods will become apparent from the following description in which, by way of example only, these methods are described with reference to a simple NLOS wireless backhaul network. Results of simulations are provided to compare the relative performance of these methods.

Figure 1:
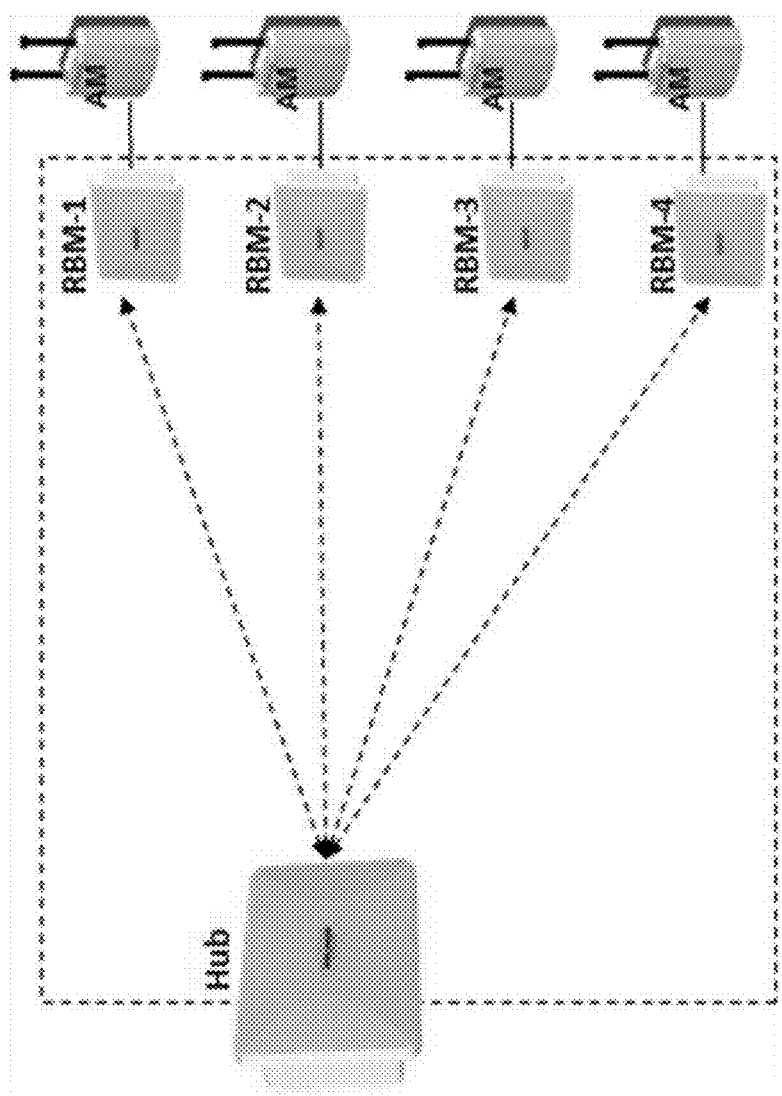
FIG. 1 shows a system model of a simple NLOS wireless backhaul network comprising one hub and 4 remote backhaul modules (RBMs), where every RBM is collocated with an access module (AM)

FIG. 1 represents a simple model of a simple NLOS wireless backhaul network comprising one hub and 4 remote backhaul modules (RBMs), where every RBM is co-located with an access module (AM) that supports the users in its PicoCell. This futuristic next generation wireless network model is used as a means to increase the network capacity for areas with dense data traffic. Unlike the classical relay problem, the backhaul architecture assumes that the wireless backhauls links and the PicoCell-base-station-to-users links operate at different frequencies. The design interest is hence to maximize the aggregate rates at the different RBM.

The performance of wireless networks is typically limited by intercell interference. Unlike traditional networks which manage interference with specific frequency reuse patterns, methods according to preferred embodiments mitigate interference via dynamic power spectrum optimization, given that the scarcity of the available bandwidth continuously pushes modern networks towards a unity frequency reuse. The proposed methods and systems relate particularly to the NLOS wireless backhaul network comprising several hubs, each connected to, or serving, its own RBMs via wireless backhaul links. RBMs belonging to one hub are separated from each other using orthogonal frequency division multiple access (OFDMA) over a fixed bandwidth, where only one RBM is active at each frequency tone. The system performance is thus limited by interhub interference solely, and not intrahub interference.

Figure 2:
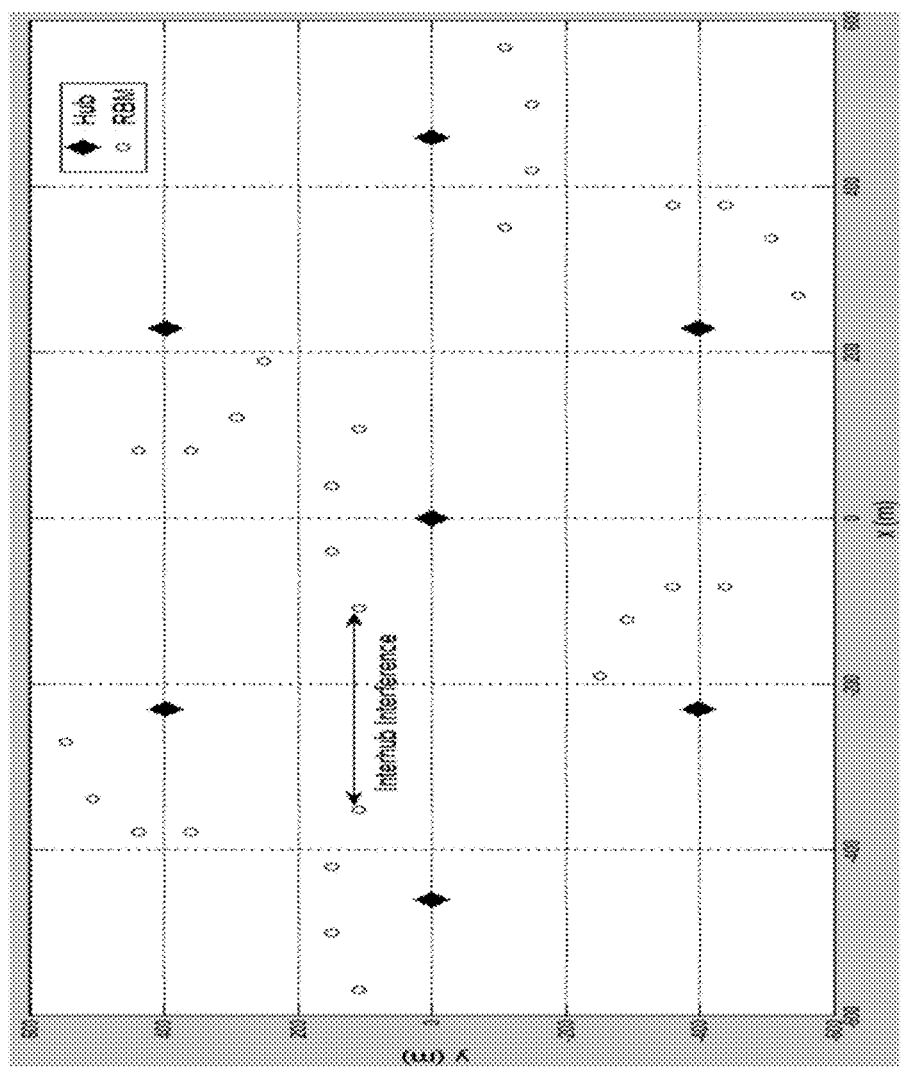
FIG. 2 shows a schematic diagram of one NLOS wireless backhaul interference network comprising seven hubs and 4 remote backhaul modules (RBMs) per hub; it also labels, by way of example only, one scenario of interhub interference.

Thus, FIG. 2 shows a schematic diagram representing a NLOS wireless backhaul interference network comprising seven hubs, and 4 remote backhaul modules (RBMs) per hub. The transmission of each hub to its own RBMs interferes with the other hubs transmissions. RBMs belonging to one hub are separated from each other using orthogonal frequency division multiple access (OFDMA) over a fixed bandwidth, where only one RBM is active at each frequency tone. The system performance is thus limited by interhub interference only.

Let N be the total number of subcarriers. For convenience, let k be the scheduled RBM of the lth hub at the nth tone, $h^n_{jlk}$, be the channel response between hub j and the kth RBM of the lth hub at the nth tone, and $\bar{h}^n_{jlk}$, be the average channel response between hub j and the kth RBM of the lth hub. Also, let $P^n_{D,l}$ be the power allocated for the lth hub at the nth tone, $SINR^n_{D,l}$ be the signal-to-interference-plus-noise ratio at the scheduled RBM of the lth hub at the nth tone, and $S_D^{max}$ be the peak power constraint imposed on each hub at every tone. While any appropriate scheduling policy may be used, preferred embodiments of the present invention are described comprising mitigating interhub interference by solving an overall proportional fairness objective across the RBMs:

$$\max \sum_{l,k} \log(\bar{R}_{D,lk}) \quad \text{Equation 1}$$

$$\text{s.t.} \quad R_{D,lk} = \sum_{\{n:k=f_D(l,n)\}} \log(1 + SINR^n_{D,l})$$

$$0 \le P^n_{D,l} \le S_D^{max} \quad \forall\, l, n$$

$$SINR^n_{D,l} = \frac{P^n_{D,l}|h^n_{llk}|^2}{\Gamma\left(\sigma^2 + \sum_{j \ne l} P^n_{D,j}|h^n_{jlk}|^2\right)}$$

Where
$\bar{R}_{D,lk}$: long term average rate of the kth RBM of the lth hub.
$R_{D,lk}$: instantaneous rate of the kth RBM of the lth hub.
$k=f_D(l, n)$ assigns kth RBM of lth hub to nth tone.

The objective function depends on both the scheduling policy and the power spectrum allocation of the different hubs across all tones. For a fixed scheduling policy, embodiments of the current invention provide novel and practical power spectrum adaptation methods to increase the weighted sum-rate across all the hubs, as the problem becomes the following weighted sum-rate optimization:

$$\max \sum_{l,k} w_{D,lk} r^n_{D,lk} \quad \text{Equation 2}$$

$$\text{s.t.} \quad 0 \le P^n_{D,l} \le S_D^{max}$$

$$r^n_{D,lk} = \log\left(1 + \frac{P^n_{D,l}|h^n_{llk}|^2}{\Gamma\left(\sigma^2 + \sum_{j \ne l} P^n_{D,j}|h^n_{jlk}|^2\right)}\right)$$

The weights $w_{D,lk}$ and the power levels are updated with the channel condition and RBM scheduling changes, so as to dynamically adapt with the interference environment. The weight $w_{D,lk}$ is set as the inverse of the long term average rate $\bar{R}_{D,lk}$.

For problems that aim at maximizing the sum-rate of the entire network, it is sufficient to set the weights $w_{D,lk}$ to 1, for all l and k.

Thus, a method according to a first embodiment, called IFEM, calculates the power of the lth hub at the nth tone using the following iterative equation:

$$P_{D,l}^n(t+1) = \left[ \frac{w_{D,lk}}{\sum_{j \neq l} w_{D,jk'} \frac{|h_{ljk'}^n|^2}{\sigma^2 + \sum_{i \neq j} P_{D,i}^n(t)|h_{ijk'}^n|^2}} \right]_0^{s_D^{max}} \quad \text{Equation 3 (IFEM)}$$

where k is the scheduled RBM of the lth hub at the nth tone, and k' is the scheduled RBM of the jth hub at the nth tone.

A method according to a second embodiment, MARA IFEM, on the other hand, calculates the power of the lth hub at the nth tone using the following iterative equation:

$$P_{D,l}^n(t) = \left[ \frac{w_{D,lk}}{\sum_{j \neq l} w_{D,jk'} \frac{|\bar{h}_{ljk'}|^2}{\sigma^2 + \sum_{i \neq j} P_{D,i}^n(\tau_{ij})|\bar{h}_{ijk'}|^2}} \right]_0^{s_D^{max}} \quad \text{Equation 4 (MARA IFEM)}$$

In MARA IFEM, the per-tone channel gains are replaced by the frequency domain average channel gains used for IFEM.

IFEM and MARA IFEM can achieve a throughput improvement of up to 14% as compared to traditional networks with maximum power transmission. Both IFEM and MARA IFEM are computationally feasible, and fast in convergence. They can be implemented in a distributed fashion, and asynchronously at each hub.

With respect to MARA-IFEM, as disclosed in Beaudin, methods are provided for measuring the channel gain between each hub and each RBM Unit, periodically during active service. The corresponding measurements can be represented as a channel matrix whose entries describe the frequency domain channel gains between each hub and each RBM of the interference environment. The MARA matrix is used in Beaudin, for example, to intelligently group each RBM to its most favorable hub, as well as to allocate resource blocks in such a way as to reduce interference between links and optimize aggregate capacity of the network, so as to organize the network in an optimal configuration.

It will be apparent that the MARA channel measurements in Beaudin can be done on a per-tone basis, for every hub-RBM pair. They are subsequently provided to either a central server for further centralized processing, or to each of the several hubs for distributed processing. To decrease the overhead of such exchange of information, the MARA measurements can alternatively provide the frequency domain average channel gains. For the sake of notation simplicity only, the MARA measurements used in the text denote the frequency domain average channel gains. Those measurements are of particular interest in fixed deployment scenarios, as is the case for wireless backhaul links, where the fading is fairly flat. The periodic repetitions of the measurements of the Self-Organizing Network (SON) method make the measurements even more useful, as it allows adapting the radio resource allocations with the dynamically changing environment. MARA measurements can therefore be utilized for interhub interference mitigation via joint dynamic power spectrum adaptation and scheduling, features that are not exploited in Beaudin. A method according to a third embodiment, Theta-IFEM, corrects the high SINR approximation of IFEM (Equation 3) by including a factor Theta that corresponds to the maximum power transmission. It calculates the power of the lth hub at the nth tone using the following iterative equation:

$$P_{D,l}^n(t+1) = \left[ \frac{w_{D,lk}}{\sum_{j \neq l} w_{D,jk'} \frac{|h_{ljk'}^n|^2}{\sigma^2 + \sum_{i \neq j} P_{D,i}^n(t)|h_{ijk'}^n|^2} \theta_{jl}^n} \right]_0^{s_D^{max}} \quad \text{Equation 5 (Theta-IFEM)}$$

Where $$\theta_{jl}^n = \frac{\frac{SINR_{D,j}^n}{1 + SINR_{D,j}^n}}{\frac{SINR_{D,l}^n}{1 + SINR_{D,l}^n}}$$

is calculated based on the maximum power transmission.

A method according to a fourth embodiment, MARA Theta-IFEM, calculates the power in a similar way to Theta-IFEM, where the per-tone channel gains are replaced by the frequency domain average channel gain.

Methods according to fifth and six embodiments, respectively, called Full-IFEM and modified-IFEM (MIFEM), account for the SINR level at each iteration.

Full-IFEM calculates the power of the lth hub at the nth tone using the following iterative equation:

$$P_{D,l}^n(t+1) = \left[ \frac{w_{D,lk} \frac{SINR_{D,l}^n(t)}{1 + SINR_{D,l}^n(t)}}{\sum_{j \neq l} w_{D,jk'} \frac{|h_{ljk'}^n|^2}{\sigma^2 + \sum_{i \neq j} P_{D,i}^n(t)|h_{ijk'}^n|^2} \frac{SINR_{D,j}^n(t)}{1 + SINR_{D,j}^n(t)}} \right]_0^{s_D^{max}} \quad \text{Equation 6 (Full-IFEM)}$$

MIFEM calculates the power of the lth hub at the nth tone using the following iterative equation:

$$P_{D,l}^n(t+1) = \left[ \frac{w_{D,lk}}{\sum_{j \neq l} t_{D,jl}^n(t)} - \frac{P_{D,l}^n(t)}{SINR_{D,l}^n(t)} \right]_0^{s_D^{max}} \quad \text{Equation 7 (MIFEM)}$$

In comparing Equation 3 (IFEM), Equation 5 (Theta IFEM), Equation 6 (Full IFEM), Equation 7 (MIFEM), it will be apparent that Equation 6, for Full-IFEM, accounts more fully for SINR at each iteration. In development of these methods, simplifications were then sought to Full-IFEM, to reduce computational complexity and/or to provide faster convergence during iteration. In comparison to Equation 6 (Full IFEM), Equation 7 (MIFEM) provides a different way of writing the gradient. Theta IFEM provides a further approximation that accounts for SINR even more simply through the Theta term, calculated based on the maximum power transmission. Equation 3 for IFEM provides even further simplification of Full IFEM, because, for a high SINR approximation, the SINR terms of Equation 6 (Full IFEM) may be further reduced.

The results of simulations presented herein demonstrate that IFEM, Theta IFEM, MIFEM, and Full IFEM, can provide significant improvements in network performance relative to conventional systems with maximum power transmission. In addition, these methods provide for simplified iterative computations, and faster convergence, relative to Newton's method. In particular, here is no need to determine the appropriate step size and direction, or solve for Hessian ($2^{nd}$ derivative) elements, as required in Newton's method.

While IFEM and related embodiments described above can offer significant advantages, certain features of IFEM and MARA IFEM methods can also beneficially be adapted or applied to provide novel Newton's methods with advantages over the conventional systems with maximum power transmission.

Thus, embodiments based on Newton's method (see Kwon et al., for example), are called MARA Newton's method (MARA NM), high SINR Newton's method (HSNM), and MARA high SINR Newton's method (MARA HSNM).

MARA NM finds the power in a similar way to Newton's method (NM) in Kwon et al., where the per-tone channel gains are replaced by the frequency domain average channel gain.

HSNM, on the other hand, calculates the power of the lth hub at the nth tone using the following iterative equation:

$$\Delta P_{D,l}^n = \frac{\frac{w_{D,lk}}{P_{D,l}^n} - \sum_{j \neq l} w_{D,jk'} \frac{|h_{ljk'}^n|^2}{\sigma^2 + \sum_{i \neq j} P_{D,i}^n |h_{ijk'}^n|^2}}{\frac{w_{D,lk}}{(P_{D,l}^n)^2}} \quad \text{Equation 8 (HSNM)}$$

$$P_{D,l}^n(t+1) = [P_{D,l}^n(t) + \mu \Delta P_{D,l}^n]_0^{S_D^{max}}$$

where $\mu$ is the ascent direction step size, and $\Delta P''_{D,l}$ is the updated Newton's direction.

MARA high SINR Newton's method (MARA HSNM) calculates the power of the lth hub at the nth tone using the following iterative equation:

$$\Delta P_{D,l}^n = \frac{\frac{w_{D,lk}}{P_{D,l}^n} - \sum_{j \neq l} w_{D,jk'} \frac{|\bar{h}_{ljk'}|^2}{\sigma^2 + \sum_{i \neq j} P_{D,i}^n |\bar{h}_{ijk'}|^2}}{\frac{w_{D,lk}}{(P_{D,l}^n)^2}} \quad \text{Equation 9 (MARA HSNM)}$$

$$P_{D,l}^n(t+1) = [P_{D,l}^n(t) + \mu \Delta P_{D,l}^n]_0^{S_D^{max}}$$

The performances of MARA NM, HSNM and MARA HSNM are similar to Full-IFEM, IFEM and MARA IFEM, respectively. They show, however, higher computational complexity, and slower convergence at high SINR level simulations.

Simulation Results

Results of simulations to compare the methods of the embodiments described above will now be described.

Figure 4:
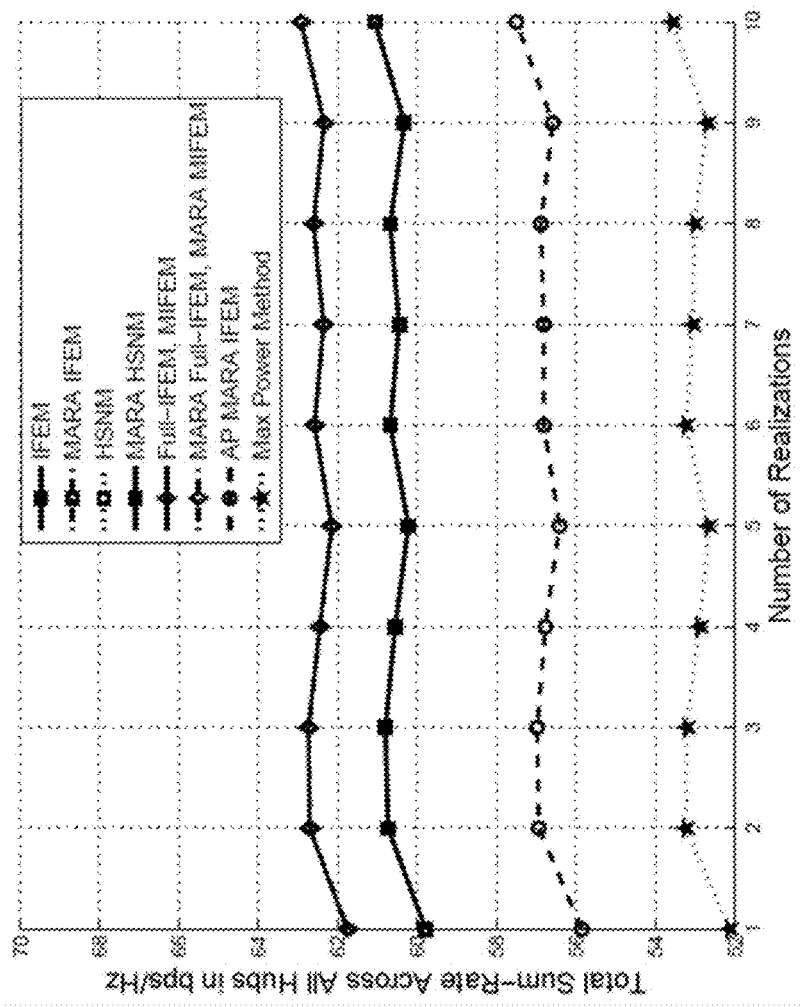
FIG. 4 shows simulations schematic that plots the total sum rate across all hubs for different realizations of the channel, and using different methods of power spectrum adaptation; the hub-to-hub distance is set to 0.5 km, and hub-to-RBM distance is set to 0.15 km.

FIG. 3 shows a table that summarizes the system parameters of the simulated network, e.g. as shown in FIG. 2. It comprises 7 hubs, with 4 RBMs per hub, with maximal frequency reuse, and 1024 subcarriers. The channel parameters correspond to a typical WIMAX deployment. FIG. 4 shows, schematically, results of simulations that plot the total sum rate across all hubs for different channel realizations (i.e., different shadowing scenarios). The hub-to-hub distance is set to 0.5 km, and hub-to-RBM distance is set to 0.15 km. The plot shows the performance comparison of the proposed methods according to each of the embodiments described above. Full-IFEM, MIFEM, MARA Full-IFEM and MARA MIFEM show the best performance, followed by IFEM, HSNM, MARA IFEM and MARA HSNM. A method according to yet another embodiment, called AP MARA IFEM, found by taking the average values of the MARA IFEM powers on a per-hub basis, shows the next best performance, and it is still superior to the conventional maximum power transmission strategy.

Figure 5:
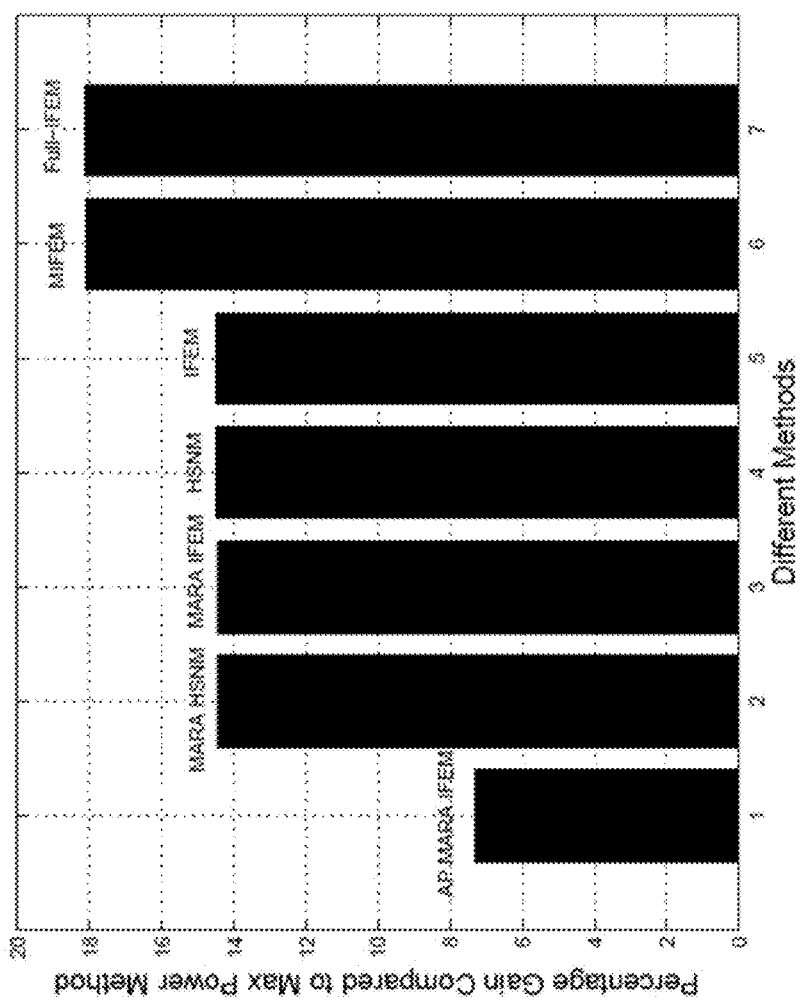
FIG. 5 shows a bar chart which summarizes the percentage gain of the suggested methods, for different channel realizations; the hub-to-hub distance is set to 0.5 km, and hub-to-RBM distance is set to 0.15 km.

FIG. 5 shows a bar chart which summarizes the percentage gain of the simulated methods in FIG. 4. Full-IFEM and MIFEM gain is approximately 18% compared to the maximum power transmission strategy. IFEM and HSNM show an approximate gain of 14% compared to the maximum power transmission strategy.

FIG. 6 is a table showing the simulated performance of the individual and total rates for the different hubs, using both IFEM and MARA IFEM. The hub-to-hub distance is set to 0.5 km, and hub-to-RBM distance is set to 0.2 km. The gain of using the per-tone channel gains in IFEM, compared to the channel average gains used in MARA IFEM, is almost the same. This is due to the fairly flat fading model of the channel.

Figure 7:
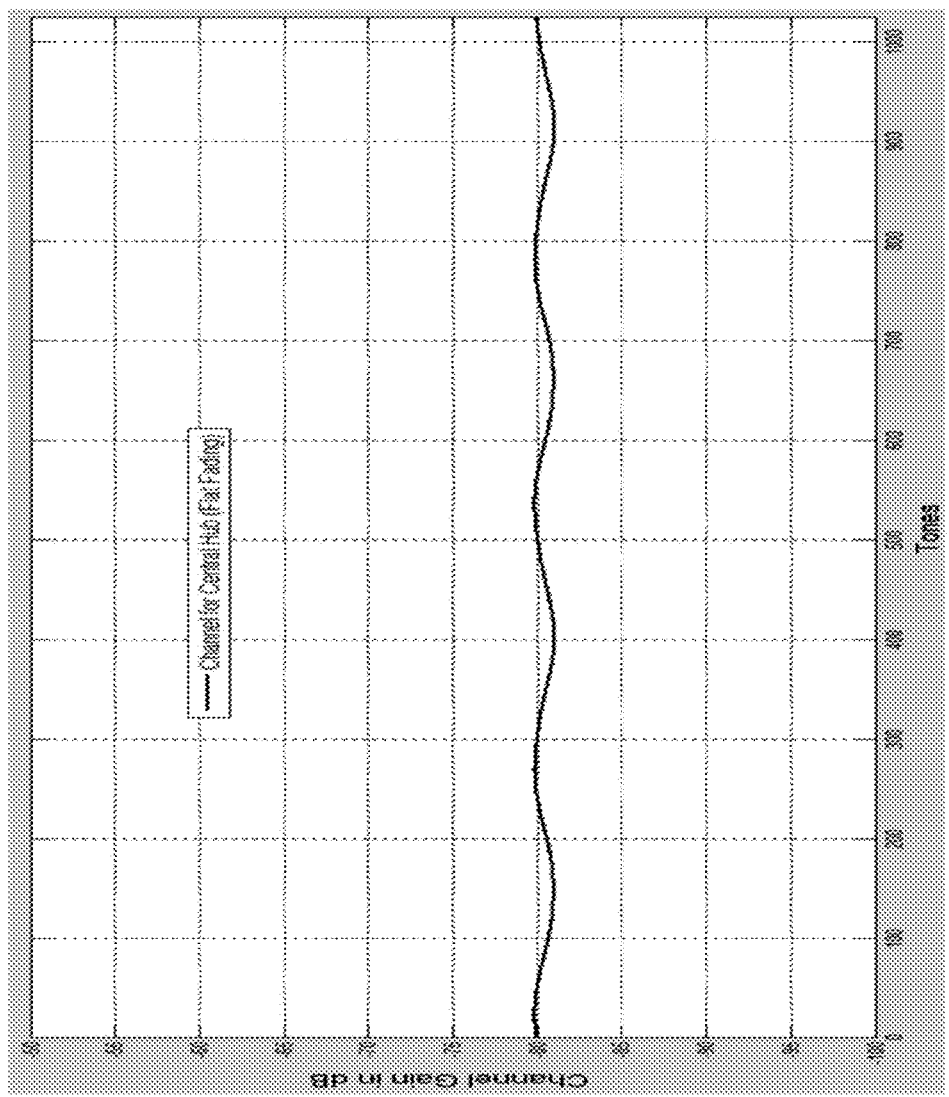
FIG. 7 shows the frequency domain gain of one particular channel of the central hub; the hub-to-hub distance is set to 0.5 km, and hub-to-RBM distance is set to 0.2 km.

FIG. 7 shows the frequency domain response of one particular channel of the central hub. The hub-to-hub distance is set to 0.5 km, and hub-to-RBM distance is set to 0.2 km. The plot shows the flat fading behavior of the channel. This is due to the fixed deployment of the hubs and RBMs, where the K-factor used in modeling the channel is typically large, due to the strong line of sight path between hubs and RBMs, as compared to the NLOS paths.

Figure 8:
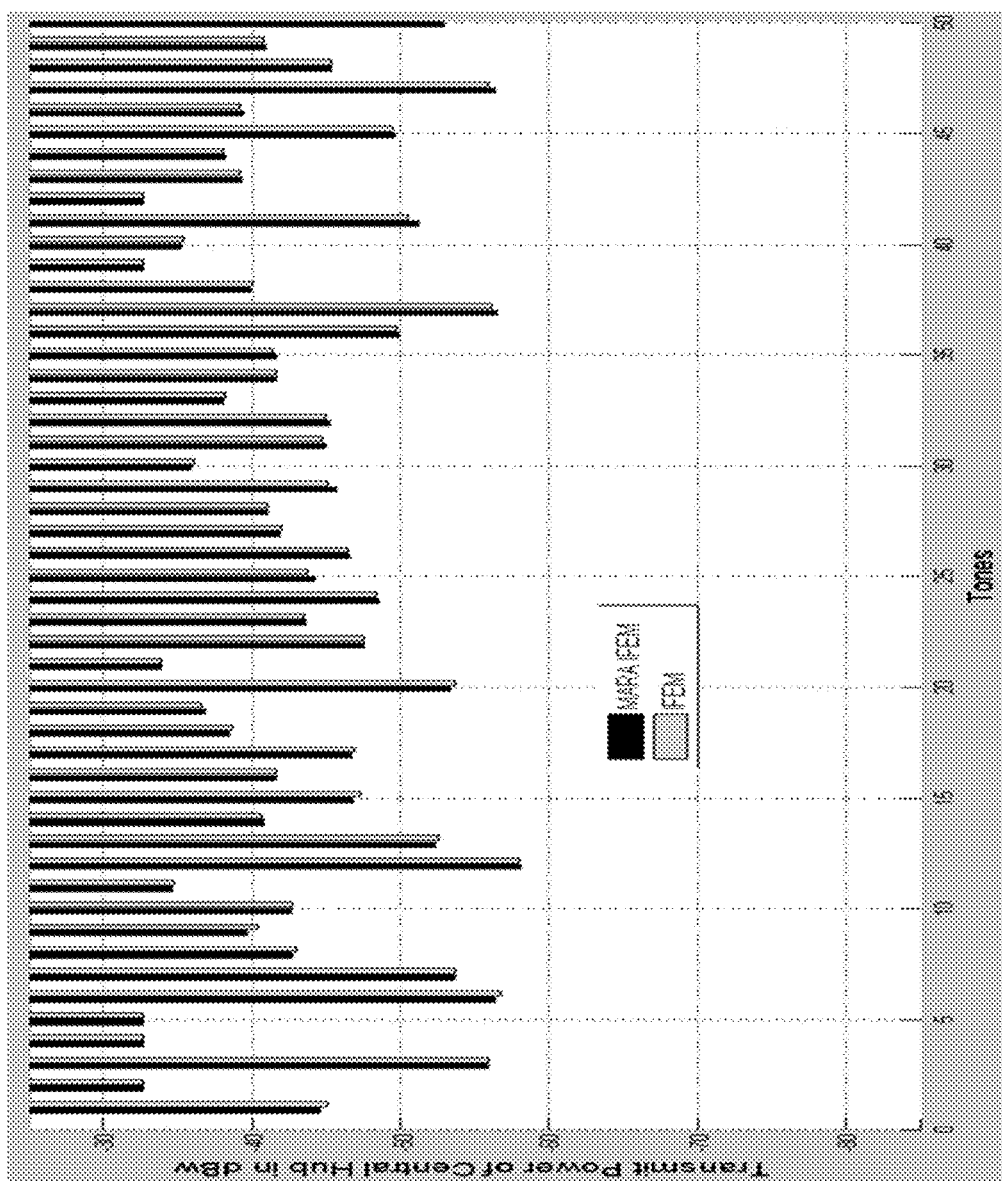
FIG. 8 shows the power spectrum allocation over the first 50 tones for both IFEM and MARA IFEM; the hub-to-hub distance is set to 0.5 km, and hub-to-RBM distance is set to 0.2 km.

FIG. 8 shows the power spectrum allocation over the first 50 tones for both IFEM and MARA IFEM. The hub-to-hub distance is set to 0.5 km, and hub-to-RBM distance is set to 0.2 km. The plot shows how close are the values that are allocated for each tone using both IFEM and MARA IFEM. This is due to the flat fading channel, which makes the per-tone channel gains quite close to the average values.

Figure 9:
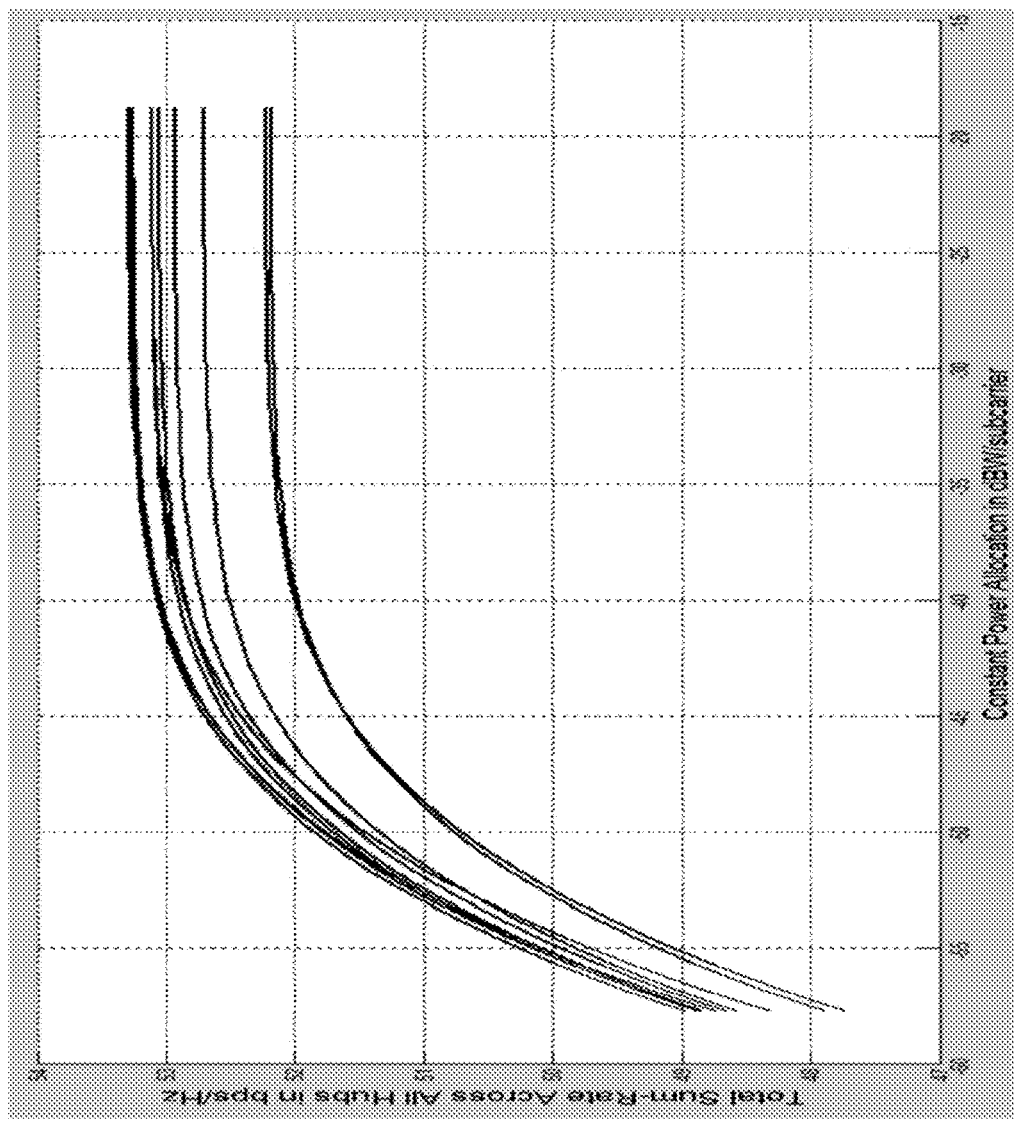
FIG. 9 shows a schematic of simulations that plots the total sum-rate for different realizations, versus various values of the same constant power allocation across all hubs; the hub-to-hub distance is set to 0.5 km, and hub-to-RBM distance is set to 0.15 km.

FIG. 9 shows schematically simulations that plot the total sum-rate for different realizations, versus various values of the same constant power allocation across all hubs. The hub-to-hub distance is set to 0.5 km, and hub-to-RBM distance is set to 0.15 km. The plot shows that the best constant power allocation is the maximum allowable power.

FIG. 10 is a table showing the simulated performance of various proposed methods, for different values of hub-to-hub distance d. The hub-to-RBM distance is set to 0.15 km. The table shows that for fixed hub-to-RBM distance, smaller cells have a higher MARA IFEM gain compared to the maximum power transmission. This is because interference is higher for smaller values of the hub-to-hub distance. Power Adaptation methods are therefore expected to offer higher gain. The table also shows how Full-IFEM and MARA IFEM performance is quite similar, especially for larger values of the hub-to-hub distance, where SINR is typically large.

FIG. 11 is a table showing the simulated performance of various proposed methods, for both cell-edge and cell-center RBMs. The hub-to-hub distance is set to 0.5 km. The table shows that for fixed hub-to-hub distance, MARA IFEM gain compared to the maximum power transmission is larger at the cell-edge than it is at the cell-center, since interference is higher at the cell-edge. The table also shows the superiority of Full-IFEM at the cell-edge of small hub-to-hub distance, where the value of SINR is relatively low.

FIG. 12 is a table showing the simulated performance of various proposed methods, for both cell-edge and cell-center RBMs. The hub-to-hub distance is set to 1 km. The table shows that for fixed hub-to-hub distance, MARA IFEM gain compared to the maximum power transmission is larger at the cell-edge than it is at the cell-center, since interference is higher at cell-edge. The table also shows Full-IFEM method and MARA IFEM performances are quite similar for large hub-to-hub distance, since the value of SINR is relatively large.

Figure 13:
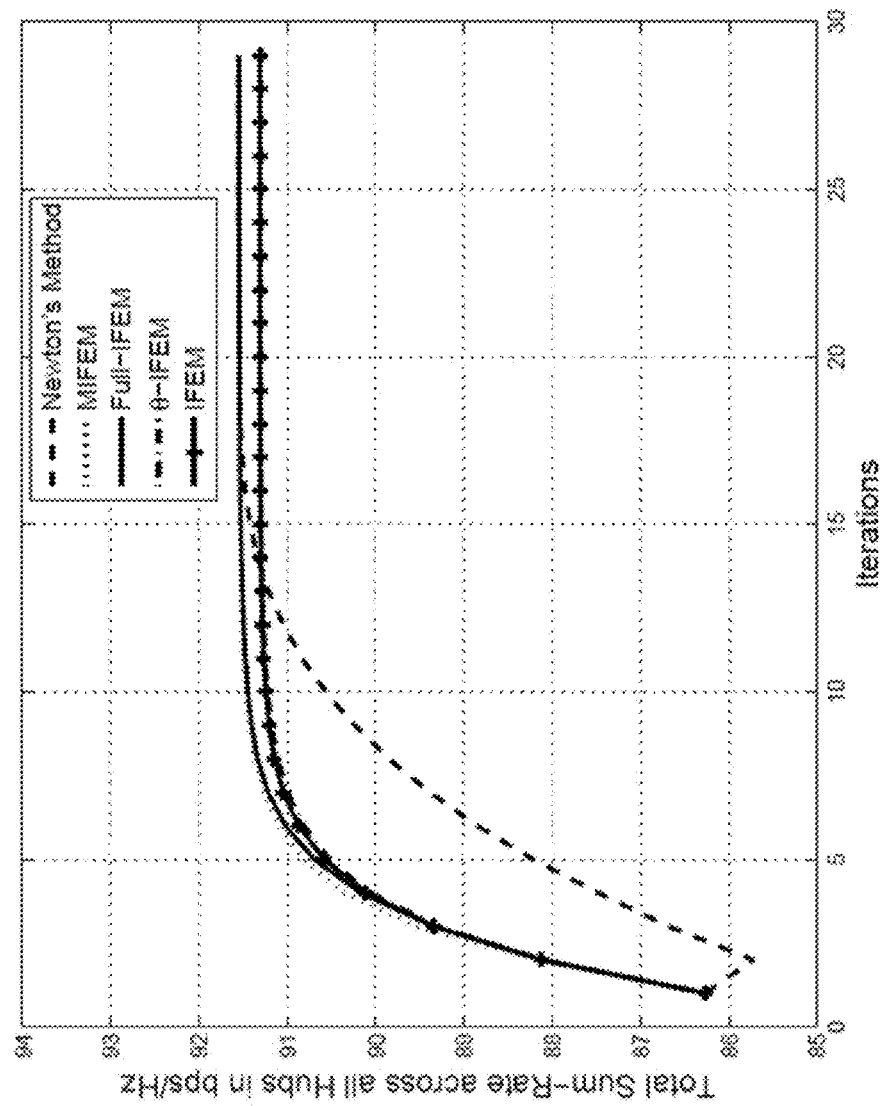
FIG. 13 plots the total sum-rate versus the number of iterations to show the convergence speed of the proposed methods for high SINR regime.

FIG. 13 plots the total sum-rate versus the number of iterations to show the convergence speed of the proposed methods for high SINR regime. It shows how the proposed methods have a faster convergence compared to Newton's method.

Figure 14:
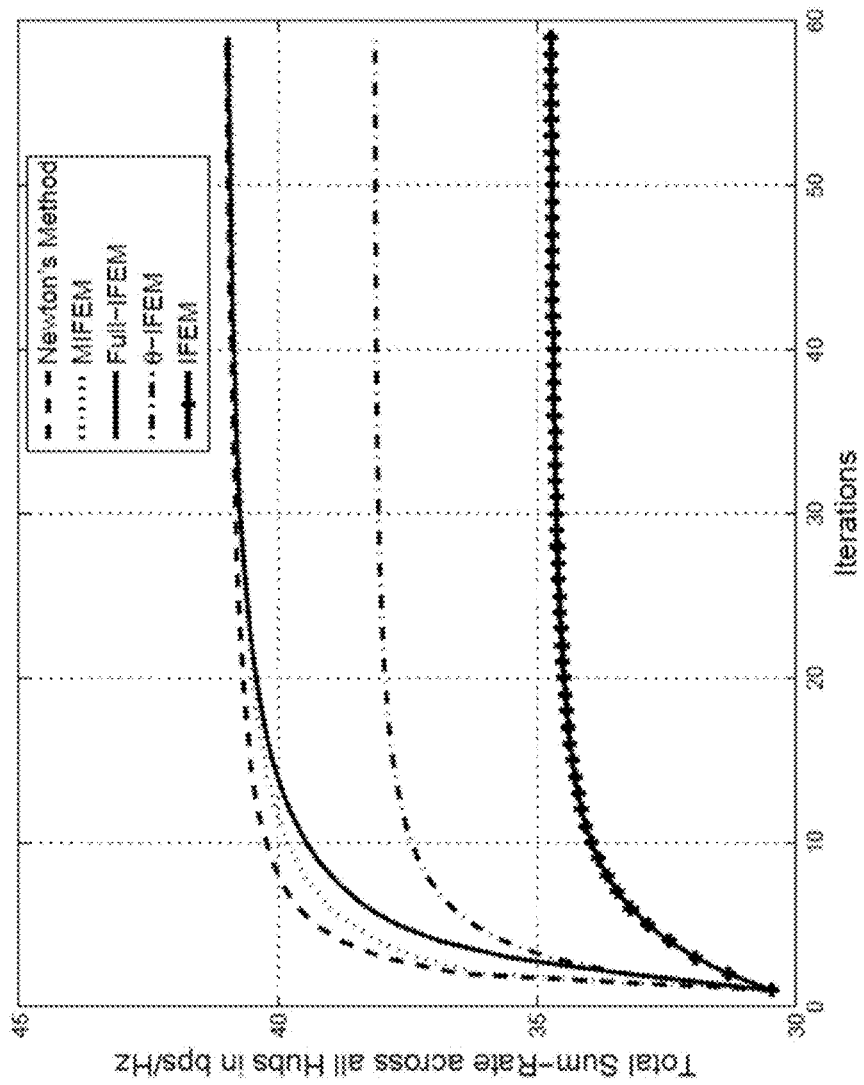
FIG. 14 plots the total sum-rate versus the number of iterations to show the convergence speed of the proposed methods for low SINR regime.

FIG. 14 plots the total sum-rate versus the number of iterations to show the convergence speed of the proposed methods for low SINR regime. It shows how the proposed methods have a fast convergence. Newton's method in this regime has the faster convergence. Its convergence, however, depends on choosing an appropriate step size, in addition to the higher computational complexity due to the Hessian terms calculations.

Figure 15:
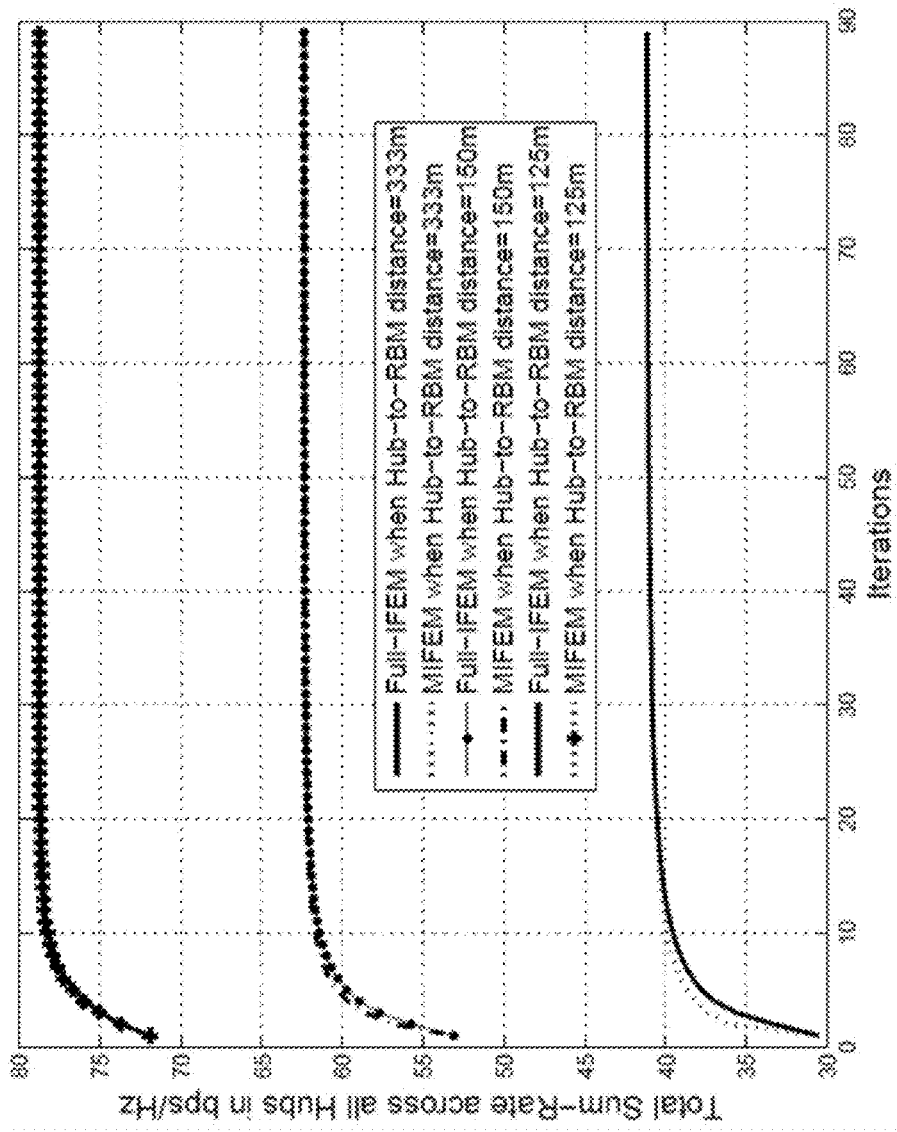
FIG. 15 plots the total sum-rate versus the number of iterations to compare the convergence speed of Full-IFEM and MIFEM under different regimes.

FIG. 15 plots the total sum-rate versus the number of iterations to compare the convergence speed of MIFEM and Full-IFEM. It shows how MIFEM converges a bit faster at low level of SINR. At high level of SINR, MIFEM and Full-IFEM curves almost overlap.

Figure 16:
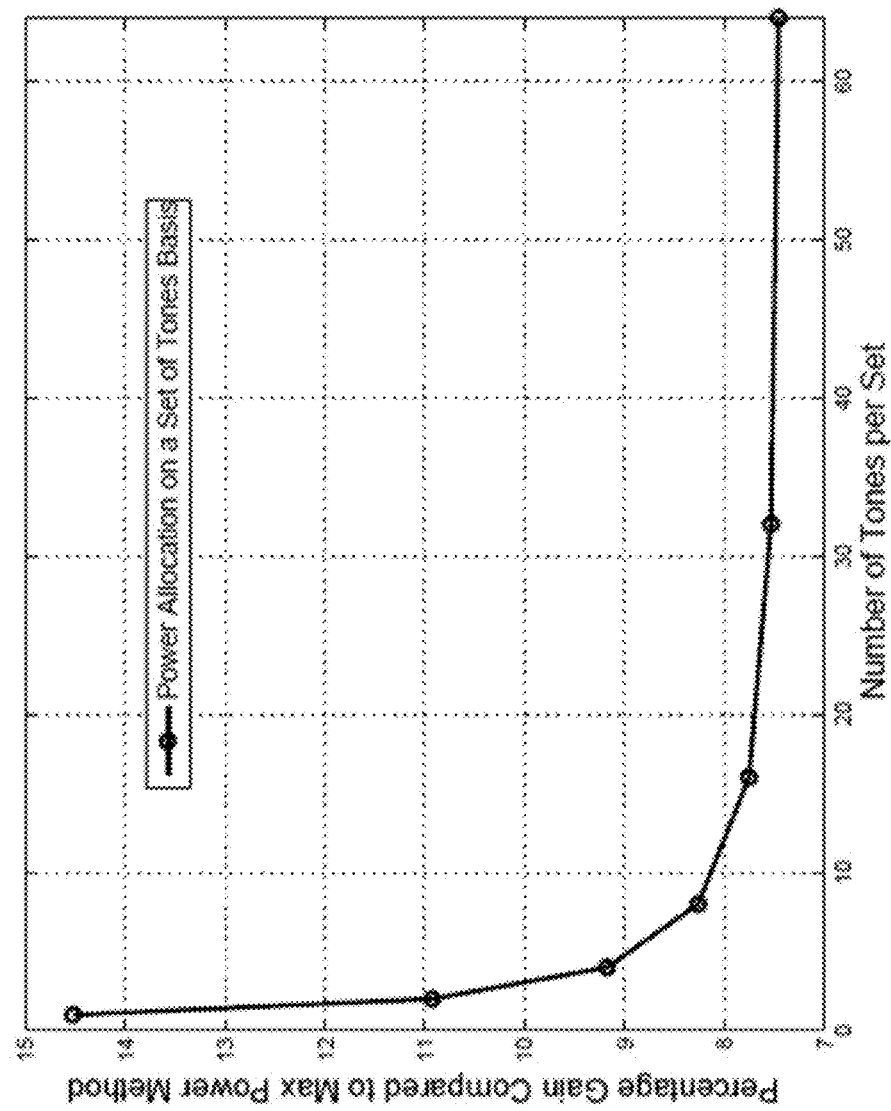
FIG. 16 is a schematic that plots the total sum-rate percentage gain for different tones set size, i.e. the set that shares the same power across its tones.

FIG. 16 is a schematic that plots the total sum-rate across for different tones set size, i.e. the set that shares the same power across its tones. For example, if the set size is 1, the sum-rate performance is at its best, since the power allocation is made on a per-tone basis. On the other hand, as the set size approaches its maximum value (i.e. the number of subcarriers), the performance decreases to reach the sum-rate corresponding to allocate the same power for every hub across all tones.

While preferred embodiments have been described in detail, it will be apparent that other variants of these methods may be provided. For example, in the simulations described above, a method called AP MARA IFEM, took the average values of the MARA IFEM powers on a per-hub basis. That is, methods wherein each hub allocates one power across all its tones by averaging the value of its power spectral density level, are envisaged. These may be referred to as AP-IFEM, AP MARA IFEM, AP Theta-IFEM, AP MARA Theta-IFEM, AP Full-IFEM, AP MARA Full-IFEM, AP MIFEM, AP MARA MIFEM, AP MARA NM, AP HSNM, AP MARA HSNM.

For a wireless backhaul network comprising a plurality of hubs, methods according to embodiments may, for example, comprise performing the method steps for determining an optimum constant power allocation across all hubs.

For maximizing the sum-rate across all the hubs, all weights w may be set to unity.

For dynamic power allocation, methods may comprise dynamically adapting the power with any changes in any one or more of channel condition, traffic, and RBM scheduling, or for example by dynamically setting the weights according to the data traffic (e.g. the queue length).

As described above, power allocation may preferably be made on a tone-by-tone basis for each individual tone. However, tones may be arranged as sets of tones $S \subseteq \{1, \ldots, N\}$ where N is the number of tones of the OFDMA multiplexing scheme, in which case power may be allocated at each iteration on a tone-set by tone-set basis.

Further refinements of these methods may also comprise accounting for phase noise by a factor $\alpha$ that denotes the scale of phase noise, as a limit on the SINR level. Thus for example, the expressions of the power update equations for Full-IFEM would then become:

$$P_{D,l}^n(t+1) = \left[ \frac{W_{D,lk} \frac{SINR_{D,l}^n(t)}{1+SINR_{D,l}^n(t)} (1 - \alpha SINR_{D,l}^n(t))}{\sum_{j \neq l} W_{D,jk'} \frac{|h_{ljk'}^n|^2 \frac{SINR_{D,j}^n(t)}{1+SINR_{D,j}^n(t)}}{\sigma^2 + \sum_{i \neq j} P_{D,i}^n(t)|h_{ijk'}^n|^2 + \alpha P_{D,j}^n(t)|h_{ljk'}^n|^2}} \right]_0^{S_D^{max}}$$

where $$SINR_{D,j}^n(t) = \frac{P_{D,j}^n(t)|h_{jjk'}^n|^2}{\Gamma\left(\sigma^2 + \sum_{i \neq j} P_{D,i}^n(t)|h_{ijk'}^n|^2 + \alpha P_{D,j}^n(t)|h_{jjk'}^n|^2\right)}$$

where $\alpha$ denotes the scale of the phase noise, used as a limit on the SINR level.

Equations used for methods according to other embodiments described above may be similarly modified, where appropriate, by a factor $\alpha$ to account for phase noise.

While embodiments are described with reference to the downlink, in other embodiments, updating of power levels may comprise adjusting transmit power in the downlink and/or the uplink.

Industrial Applicability

Systems, methods, apparatuses, and software products according to embodiments of the present invention are particularly applicable to practical power spectrum adaptation techniques for Non Line of Sight (NLOS) wireless backhaul products in MicroCell and PicoCell networks, as well as Fixed Wireless Access Networks. Unlike the classical relay problem, the backhaul architecture assumes that the wireless backhaul links and the access links operate at different frequencies. From a backhaul design perspective, the interest is therefore mitigating the interhub interference, thereby maximizing the aggregate data capacity of the RBMs. The power spectrum adaptation of every hub thus becomes crucial to increase the system throughput.

An important feature of the backhaul networks is the fixed deployment of both hubs and RBMs, and the relatively strong line-of-sight between hubs and RBMs, as compared to other NLOS paths. Such a feature makes the measurements of the frequency domain average channel gain, as described in Beaudin for managed adaptive resource allocation (MARA), quite useful, as they can be used in methods as described above, referred to as MARA IFEM and MARA Theta-IFEM. These methods can improve the system performance up to 27% as compared to traditional systems with fixed transmit power spectrum, can be implemented in a distributed fashion, and asynchronously across all hubs. Full-IFEM and MIFEM performance can be improved up to 34% compared to traditional systems, and with lower computational complexity than Newton's method as described in Kwon et al.

Embodiments of the present invention also have application to future or next generation wireless networks, including access systems, where power spectrum adaptation methods are expected to play a major role in improving the systems performance, given the scarcity of the available radio resources.

The disclosed methods and apparatuses provide practical solutions, with simple or reduced computational complexity and fast convergence. In particular, Theta-IFEM, IFEM, MARA Theta-IFEM, and MARA IFEM outperform traditional systems, and can be implemented in a distributed fashion, and asynchronously at each transmitter.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for mitigating interference in a wireless backhaul network comprising a plurality of nodes, each comprising a transmitter and a receiver, and wherein the plurality of nodes of the network comprise a plurality of hubs of the wireless backhaul network, each of said plurality of hubs serving a plurality of Remote backhaul Nodules (RBMs), comprising the steps of:
   determining an appropriate power spectral density level, for each of the plurality of nodes at each of a plurality of tones, based on known scheduling assignments and frequency domain channel gains for each link, comprising:
   performing an iterative operation to find the power spectral density at each tone, on an individual tone-by-tone basis, or optionally, on a tone set-by-set basis;
   updating power levels of each node, at each iteration and at each tone or for each tone set;
   wherein performing the iterative operation comprises, for an initial power level or a power level of a previous iteration, and for an objective function based on scheduling assignments for each node at all tones or tone sets, iteratively optimizing a weighted sum-rate across all nodes, and
   wherein for an objective function comprising a proportional fairness function, the iterative operation comprises a sum-rate optimization defined by:

$$\max \quad \sum_{l,k} w_{D,lk} r_{D,lk}^n \qquad \text{Equation 2}$$

$$\text{s.t.} \quad 0 \le P_{D,l}^n \le S_D^{max}$$

$$r_{D,lk}^n = \log\left(1 + \frac{P_{D,l}^n |h_{jlk}^n|^2}{\Gamma\left(\sigma^2 + \sum_{j\ne l} P_{Dj}^n |h_{jlk}^n|^2\right)}\right)$$

where:
N is total number of subcarriers;
k is the scheduled RBM of the lth hub at the nth tone;
$h_{jlk}^n$ is the channel response between hub j and the kth RBM of the lth hub at the nth tone;
$\bar{h}_{jlk}^n$ is the average channel response between hub j and the kth RBM of the lth hub;
$W_{D,lk}$ is a respective weight;
$P_{D,l}^n$ is the power allocated for the lth hub at the nth tone;
$SINR_{D,l}^n$ is the signal-to-interference-plus-noise ratio at the scheduled RBM of the lth hub at the nth tone;

and $S_D^{max}$ is the peak power constraint imposed on each hub at every tone.

2. A method according to claim 1 wherein said frequency domain channel gains comprise per tone channel gains, and comprising allocating power on a tone by tone basis at each iteration.

3. A method according to claim 1 wherein tones comprise sets of tones $S \subseteq \{1, \ldots, N\}$ where N is the number of tones of the OFDMA multiplexing scheme, and said frequency domain channel gains comprise per tone set channel gains and comprising allocating power at each iteration on a tone-set by tone-set basis.

4. A method according to claim 1 wherein said frequency domain channel gains comprise frequency domain average channel gains.

5. A method according to claim 4 wherein said frequency domain average channel gains comprise MARA matrix frequency domain average channel gains.

6. A method according to claim 1 wherein the scheduling assignments are determined by a fixed scheduling policy.

7. A method according to claim 1 wherein, the step of updating of power levels comprises adjusting the transmit powers in the downlink and/or the uplink.

8. A method according to claim 1 wherein the weights $W_{D,lk}$ and the power levels are updated with channel conditions and RBM scheduling changes, so as to dynamically adapt to the interference environment.

9. A method according to claim 1 wherein the weight $W_{D,lk}$ is set as the inverse of the long term average rate $\bar{R}_{D,lk}$.

10. A method according to claim 1 wherein for maximizing the sum-rate of the entire network, weights $W_{D,lk}$ are set to 1, for all l and k.

11. A method of mitigating interference in a wireless network according to claim 1 wherein power allocation is based on the per tone channel gains and scheduling assignments (IFEM).

12. The method of claim 11 (IFEM), wherein the power of the lth hub at the nth tone is calculated iteratively using the following equation:

$$P_{D,l}^n(t+1) = \left[\frac{w_{D,lk}}{\sum_{j\ne l} w_{D,jk'} \frac{|h_{ljk'}^n|^2}{\sigma^2 + \sum_{i\ne j} P_{D,i}^n(t)|h_{ijk'}^n|^2}}\right]_0^{S_D^{max}}$$

where k is the scheduled RBM of the lth hub at the nth tone, and k' is the scheduled RBM of the jth hub at the nth tone.

13. A method according to claim 1, wherein power allocation is based on scheduling assignment and frequency domain average channel gains or frequency domain average channel gains determined by a MARA matrix (MARA IFEM).

14. The method of claim 13, wherein the power of the lth hub at the nth tone is calculated iteratively using the following equation:

$$P_{D,l}^n(t) = \left[\frac{w_{D,lk}}{\sum_{j\ne l} w_{D,jk'} \frac{|\bar{h}_{ljk'}|^2}{\sigma^2 + \sum_{i\ne j} P_{D,i}^n(\tau_{ij})|\bar{h}_{ijk'}|^2}}\right]_0^{S_D^{max}}$$

where k is the scheduled RBM of the lth hub at the nth tone, and k' is the scheduled RBM of the jth hub at the nth tone.

15. A method according to claim 1 (Theta-IFEM) wherein power allocation is based on the per tone channel gain and scheduling assignment, and further comprising a correcting factor Theta, calculated based on a maximum power transmission.

16. The method of claim 15, wherein the power of the lth hub at the nth tone is calculated iteratively using the following equation:

$$P_{D,l}^n(t+1) = \left[ \frac{W_{D,lk}}{\sum_{j \neq l} W_{D,jk'} \frac{|h_{ljk'}^n|^2}{\sigma^2 + \sum_{i \neq j} P_{D,i}^n(t)|h_{ijk'}^n|^2} \theta_{jl}^n} \right]_0^{s_D^{max}}$$

where $$\theta_{jl}^n = \frac{\frac{SINR_{D,j}^n}{1+SINR_{D,j}^n}}{\frac{SINR_{D,l}^n}{1+SINR_{D,l}^n}}$$

where k is the scheduled RBM of the lth hub at the nth tone, and k' is the scheduled RBM of the jth hub at the nth tone.

17. A method according to claim 16, wherein channel average gains replace per tone channel gains in said equation.

18. A method according to claim 1 (MARA Theta-IFEM), wherein power allocation is based on frequency channel average gains derived from a MARA matrix, and scheduling assignment, and further comprising a correcting factor Theta, calculated based on a maximum power transmission.

19. A method according to claim 1, (Full-IFEM), wherein power updating is based on the per-tone channel gain and the scheduling assignments, and further comprises factors that depend on the SINR levels at each iteration.

20. The method of claim 19, wherein the power of the lth hub at the nth tone is calculated iteratively using the following equation:

$$P_{D,l}^n(t+1) = \left[ \frac{W_{D,lk} \frac{SINR_{D,l}^n(t)}{1+SINR_{D,l}^n(t)}}{\sum_{j \neq l} W_{D,jk'} \frac{|h_{ljk'}^n|^2}{\sigma^2 + \sum_{i \neq j} P_{D,i}^n(t)|h_{ijk'}^n|^2} \frac{SINR_{D,j}^n(t)}{1+SINR_{D,j}^n(t)}} \right]_0^{s_D^{max}}$$

where k is the scheduled RBM of the lth hub at the nth tone, and k' is the scheduled RBM of the jth hub at the nth tone.

21. A method according to claim 19 (for Full IFEM), further comprising accounting for phase noise by a factor α such that the equation becomes:

$$P_{D,l}^n(t+1) = \left[ \frac{W_{D,lk} \frac{SINR_{D,l}^n(t)}{1+SINR_{D,l}^n(t)}(1-\alpha SINR_{D,l}^n(t))}{\sum_{j \neq l} W_{D,jk'} \frac{|h_{ljk'}^n|^2}{\sigma^2 + \sum_{i \neq j} P_{D,i}^n(t)|h_{ijk'}^n|^2 + \alpha P_{D,j}^n(t)|h_{ljk'}^n|^2} \frac{SINR_{D,j}^n(t)}{1+SINR_{D,j}^n(t)}} \right]_0^{s_D^{max}}$$

where $$SINR_{D,j}^n(t) = \frac{P_{D,j}^n(t)|h_{ljk'}^n|^2}{\Gamma \left( \sigma^2 + \sum_{i \neq j} P_{D,i}^n(t)|h_{ijk'}^n|^2 + \alpha P_{D,j}^n(t)|h_{ljk'}^n|^2 \right)}$$

and α denotes the scale of the phase noise, used as a limit on the SINR level.

22. A method according to claim 1, (Modified-IFEM (MIFEM)) wherein power allocation comprises updating power based on the per-tone channel gain and the scheduling assignment and further comprises factors that depend on the interference levels at each iteration.

23. The method of claim 22 wherein the power of the lth hub at the nth tone is calculated iteratively using the following equation:

$$P_{D,l}^n(t+1) = \left[ \frac{W_{D,lk}}{\sum_{j \neq l} t_{D,jl}^n(t)} - \frac{P_{D,l}^n(t)}{SINR_{D,l}^n(t)} \right]_0^{s_D^{max}}$$

where k is the scheduled RBM of the lth hub at the nth tone, and k' is the scheduled RBM of the jth hub at the nth tone.

24. A method according to claim 1, comprising an Average Powers (AP) approximation, wherein each node or hub allocates one power across all its tones by averaging the value of its power spectral density level determined by the preceding method steps.

25. A method according to claim 1, comprising performing said method steps for determining an optimum constant power allocation across all the hubs of the backhaul wireless network.

26. A method according to claim 1, wherein the weights $W_{D,lk}$ and the power levels are updated with channel conditions and RBM scheduling changes, so as to dynamically adapt to the interference environment.

27. A method according to claim 1, further comprising accounting for phase noise by a factor α that denotes the scale of phase noise, as a limit on the SINR level in the expressions of the power update equations.

28. A non-transitory computer readable storage medium storing instructions, which when executed in a processor means of a wireless backhaul network, perform the steps of claim 1.

29. A system comprising processor means in a wireless backhaul network comprising a plurality of nodes, each comprising a transmitter and a receiver, and wherein nodes of the network comprise a plurality of hubs of the wireless backhaul network, each of said plurality of hubs serving a plurality of RBMs (Remote backhaul Modules), said processor means being configured for implementing the steps of claim 1.

30. A method for mitigating interference in a wireless network comprising a plurality of nodes, comprising the steps of:
  determining an appropriate power spectral density level, for each of the plurality of nodes at each of a plurality of tones, based on known scheduling assignments and frequency domain channel gains, comprising:
  performing an iterative operation based on Newton's method to find the power spectral density on a tone-by-tone basis;
  updating power levels of each node, at each iteration and at each tone, based on power levels of an initial or previous iteration at the same tone, a step size and an updated Newton's direction; and
  wherein the updating of power levels is based on:
  a) per-tone channel gains and scheduling assignments, and a high SINR approximation of Newton's direction (HSNM), or
  b) channel average gains derived from a MARA matrix, and scheduling assignments (MARA NM) or
  c) channel average gains, scheduling assignments, and a high SINR approximation of Newton's direction (MARA HSNM),
  and, wherein for the high SINR approximation of Newton's direction used in Newton's method, the power of the lth hub at the nth tone is calculated iteratively using the following equation:

$$\Delta P_{D,l}^n = \frac{\frac{W_{D,lk}}{P_{D,l}^n} - \sum_{j \neq l} w_{D,jk'} \frac{|h_{ljk'}^n|^2}{\sigma^2 + \sum_{i \neq j} P_{D,i}^n |h_{ijk'}^n|^2}}{\frac{W_{D,lk}}{(P_{D,l}^n)^2}}$$

$$P_{D,l}^n(t+1) = [P_{D,l}^n(t) + \mu \Delta P_{D,l}^n]_0^{S_D^{max}}$$

where $\mu$ is the ascent direction step size, k is the scheduled RBM of the lth hub at the nth tone, k' is the scheduled RBM of the jth hub at the nth tone;

$h''_{ljk'}$ is the channel response between hub l and RBM k' of the jth hub at the nth tone;

$W_{D,lk}$ are weights;

$P''_{D,l}$ is the power allocated for the lth hub at the nth tone;

$S_D^{max}$ is the peak power constraint imposed on each hub at every tone;

and $\Delta P''_{D,l}$ is the updated Newton's direction.

31. A method for mitigating interference in a wireless network comprising a plurality of nodes, comprising the steps of:
  determining an appropriate power spectral density level, for each of the plurality of nodes at each of a plurality of tones, based on known scheduling assignments and frequency domain channel gains, comprising:
  performing an iterative operation based on Newton's method to find the power spectral density on a tone-by-tone basis;
  updating power levels of each node, at each iteration and at each tone, based on power levels of an initial or previous iteration at the same tone, a step size and an updated Newton's direction; and wherein the updating of power levels is based on:
a) per-tone channel gains and scheduling assignments, and a high SINR approximation of Newton's direction (HSNM), or
b) channel average gains derived from a MARA matrix, and scheduling assignments (MARA NM) or
c) channel average gains, scheduling assignments, and a high SINR approximation of Newton's direction (MARA HSNM), and, wherein for the MARA high SINR approximation of Newton's direction used in Newton's method, the power of the lth hub at the nth tone is calculated iteratively using the following equation:

$$\Delta P_{D,l}^n = \frac{\frac{W_{D,lk}}{P_{D,l}^n} - \sum_{j \neq l} w_{D,jk'} \frac{|\bar{h}_{ljk'}|^2}{\sigma^2 + \sum_{i \neq j} P_{D,i}^n |\bar{h}_{ijk'}|^2}}{\frac{W_{D,lk}}{(P_{D,l}^n)^2}}$$

$$P_{D,l}^n(t+1) = [P_{D,l}^n(t) + \mu \Delta P_{D,l}^n]_0^{S_D^{max}}$$

where $\mu$ is the ascent direction step size, k is the scheduled RBM of the lth hub at the nth tone, k' is the scheduled RBM of the jth hub at the nth tone;

$h''_{ljk}$ is the channel response between hub l and RBM k' of the jth hub at the nth tone;

$W_{D,lk}$ are weights;

$P''_{D,l}$ is the power allocated for the lth hub at the nth tone;

$S_D^{max}$ is the peak power constraint imposed on each hub at every tone;

and $\Delta P''_{D,l}$ is the updated Newton's direction.

* * * * *